United States Patent
Yanagisawa

(10) Patent No.: US 6,462,325 B1
(45) Date of Patent: Oct. 8, 2002

(54) CIRCUIT FOR DETECTING THE SHUTOFF OF AN OPTICAL OUTPUT

(75) Inventor: Hiroki Yanagisawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/451,976

(22) Filed: Nov. 30, 1999

(30) Foreign Application Priority Data

Nov. 30, 1998 (JP) .......................................... 10-340554

(51) Int. Cl.[7] ................................................. A01J 40/14
(52) U.S. Cl. ..................... 250/214 R; 250/551; 359/187
(58) Field of Search ...................... 250/214 R, 214 C, 250/214 SW, 205, 551; 372/29.01; 359/187

(56) References Cited

U.S. PATENT DOCUMENTS 4,782,327 A * 11/1988 Kley et al. ..................... 341/2

6,178,213 B1 * 1/2001 McCormack et al. ....... 375/355
6,188,498 B1 * 2/2001 Link et al. ................... 359/187

FOREIGN PATENT DOCUMENTS

| JP | 62-26943 | 2/1987 |
|----|----------|--------|
| JP | 2-290341 | 11/1990 |
| JP | 6-83153 | 10/1994 |
| JP | 10-256990 | 9/1998 |

* cited by examiner

Primary Examiner—Que T. Le
Assistant Examiner—Thanh X. Luu
(74) Attorney, Agent, or Firm—Scully, Scott, Murphy & Presser

(57) ABSTRACT

An optical output shutoff detecting circuit of the present invention includes a flip-flop. The flip-flop has a D terminal to which a signal representative of a result of comparison between the output level of an optical signal output from a laser diode and a reference signal is input, and a C terminal to which a signal produced by delaying a data signal is input. The output signal of the flip-flop is used to detect the output level of the optical signal.

3 Claims, 9 Drawing Sheets

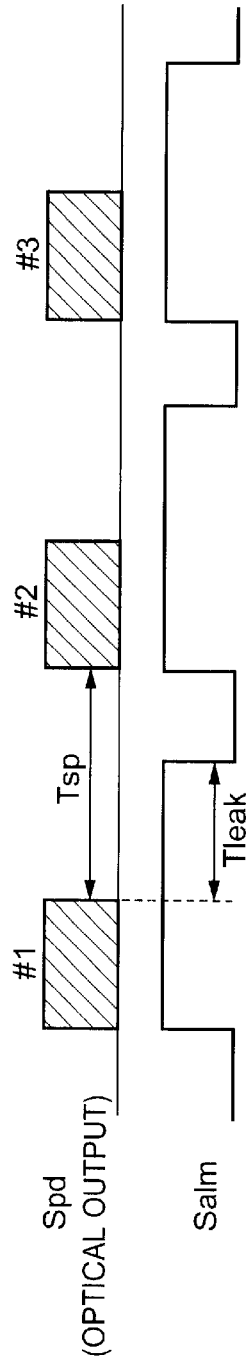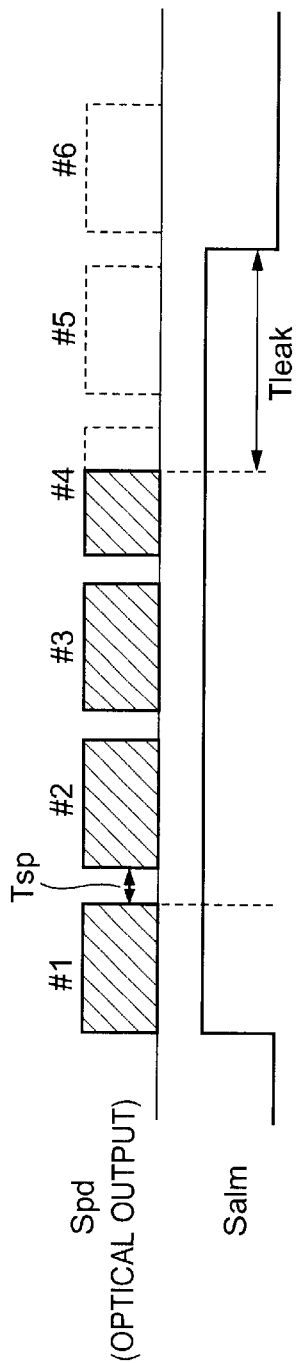

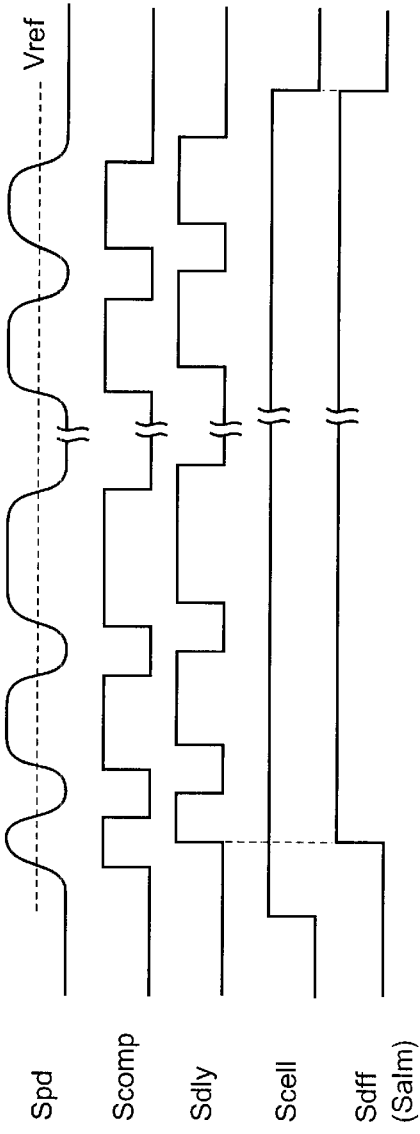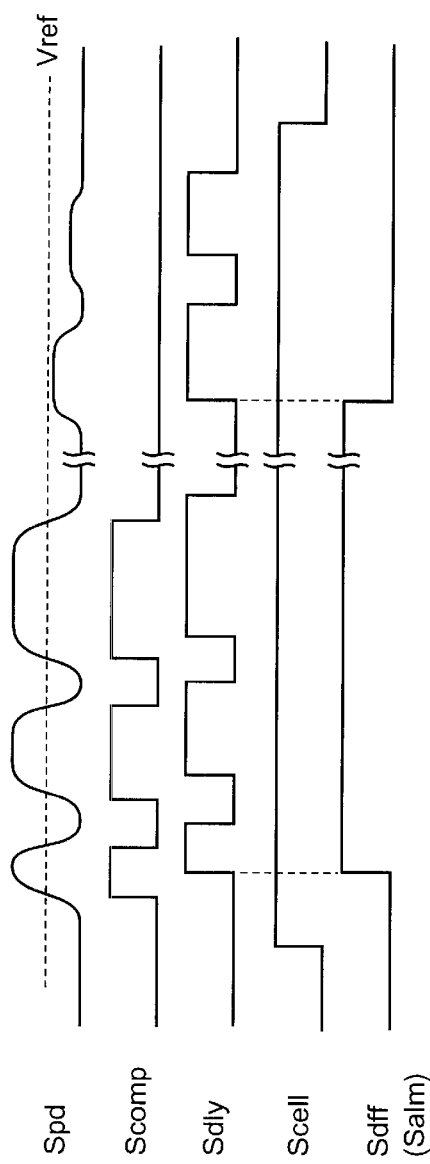

CIRCUIT FOR DETECTING THE SHUTOFF OF AN OPTICAL OUTPUT

BACKGROUND OF THE INVENTION

The present invention relates to a circuit for detecting the shutoff of an optical output for use particularly in circuitry for sending optical signals in bursts or cells.

In parallel with the progress of information-oriented society, communication technologies using optical fibers are under development to implement economical, ultrahigh speed digital communication. Japanese Patent Laid-Open Publication No. 2-290341, for example, discloses a bidirectional optical transmission system capable of detecting the shutoff of a light beam for protecting the eyes of an operator working at an office from a light beam output from an optical transmitter. Japanese Patent Laid-Open Publication No. 10-256990 teaches a simple optical transmitter/receiver constructed to constantly monitor a stand-by system by using the same optical wavelength band as a main signal. Further, Japanese Patent Publication No. 6-83153 proposes a fault monitoring method allowing the individual subscriber station to detect a fault occurred on the subscriber line with the respective monitoring mechanism.

The conventional transmission of optical signals in the form of bursts or cells will be briefly described hereinafter. FIG. 1 schematically shows a conventional PON (Passive Optical Network) system including three ONUs (Optical Network Units) 111, 113 and 115 each being situated at a particular subscriber station. The ONUs 111, 113 and 115 are connected to an office 117 via a star coupler 119.

In the PON system shown in FIG. 1, optical signals output from the ONUs 111, 113 and 115 are multiplexed on a time division basis and sent toward the office 117 (up-going direction hereinafter) in the form of cells. A transmitter/receiver, not shown, built in each of the ONUs 111, 113 and 115 must include a circuit for monitoring the respective optical signal to see if a normal optical output level is being sent or not, i.e., to detect the shutoff of the optical output.

Reference will be made to FIG. 2 for describing an optical output shutoff detecting circuit included in each of the ONUs 111, 113 and 115. As shown, the circuit is generally made up of a laser diode (LD) 101, a photodiode (PD) 102, a preamplifier 103, an amplifier 104, a peak detector 105, a comparator 106, and a driver 107.

A clock signal Sclk and a data signal Sdata are input to the driver 107. The driver 107 digitally modulates the data signal Sdata in synchronism with the clock signal Sclk and drives the LD 101 with the resulting modulated signal. The PD 102 monitors part of a light beam issuing from the LD 101 while generating a photocurrent.

The preamplifier 103 coverts the above photocurrent to a voltage to thereby output a voltage signal. The amplifier 104 further amplifies the voltage signal output from the preamplifier 103. The peak detector 105 detects the peak value of the voltage signal output from the amplifier 104. The comparator 106 compares the detected peak value with a reference voltage Vref in order to determine whether or not the optical output level is higher than a preselected level.

FIG. 3 shows waveforms representative of specific outputs of the constituents of the above shutoff detecting circuit. As shown, the preamplifier 103 outputs a signal Spd while the amplifier 104 outputs a signal Samp by amplifying the signal Spd. The peak detector 105 searches for the peak value of the signal Samp, as represented by a signal Speak. The comparator 106 outputs a signal Salm representative of the result of comparison. Specifically, the comparator 106 outputs a high level (high voltage) when the signal Speak is lower than the reference voltage Vref or outputs a low level (low voltage) when the former is lower than the latter. The low level of the signal Salm indicates that the optical output level of the LD 101 is lower than a preselected level (generation of an alarm).

With the above configuration, the conventional circuit shown in FIG. 2 is capable of easily detecting the shutoff of the optical output on the basis of the signal Salm output from the comparator 106. However, the conventional circuit is not always successful to detect the shutoff of the optical output. Specifically, the peak detector 105 relies on the charging and discharging characteristic of a capacitor. While a period of time of the order of nanoseconds (Tchg, FIG. 3) suffices for the capacitor to be charged for detecting a peak value, a period of time of the order of more than microseconds (Tleak) is necessary for the capacitor to be discharged due to free discharge. In a system with a transmission rate of, e.g., 156 Mb/s in the up-going direction, the above period of time Tleak corresponds to as many as 100 bits.

The problem of the conventional shutoff detecting circuit will be described more specifically with reference to FIGS. 4A and 4B. There are shown in FIGS. 4A and 4B specific optical output monitor signals Spd and specific shutoff alarm signals Salm appearing in the circuit of any one of the ONUs. In FIGS. 4A and 4B, cells #2, #3 and so forth sequentially appear. First, as shown in FIG. 4A, so long as the interval Tsp between the consecutive cells is sufficiently longer than the capacitor discharge time Tleak, the signal Salm successfully goes high before the next cell appears. However, as shown in FIG. 4B, assume that the interval Tsp is shorter than the discharge time Tleak. Then, when the shutoff of the optical output occurs in the middle of, e.g., a cell #4, the circuit fails to detect it immediately and erroneously determines that the next cell #5 also has the expected optical output level.

Particularly, in a system capable of freely varying the band allotment to ONUs, i.e., the occupancy ratio of the cells of the individual ONU in the up-going time domain, it frequently occurs that the cells of a particular ONU continuously appear, as shown in FIG. 4B. This aggravates the above erroneous detection by the conventional circuit.

SUMMARY OF THE INVENTION

It is therefore an object of the present invention to provide an optical output shutoff detecting circuit capable of automatically detecting the drop of an optical output level with high accuracy and generating an alarm immediately.

An optical output shutoff detecting circuit of the present invention includes a flip-flop. The flip-flop has a D terminal to which a signal representative of a result of comparison between the output level of an optical signal output from a laser diode and a reference signal is input, and a C terminal to which a signal produced by delaying a data signal is input.

The output signal of the flip-flop is used to detect the output level of the optical signal.

The flip-flop included in the above circuit determines an emission state every bit of a data signal. It follows that when the optical output level drops below a preselected value, the circuit can detect the drop immediately.

Further, the circuit may include an AND gate for ANDing the output of the flip-flop and a signal representative of the duration of a cell to be sent in order to enhance reliable detection.

BRIEF DESCRIPTION OF THE DRAWINGS

The above and other objects, features and advantages of the present invention will become more apparent from the following detailed description when taken with the accompanying drawings in which:

FIGS. 4A and 4B are charts each showing cells or bursts appearing in a particular condition;

FIGS. 6A and 6B are charts each showing specific waveforms of signals appearing in the illustrative embodiment in a particular condition;

Figure 1:
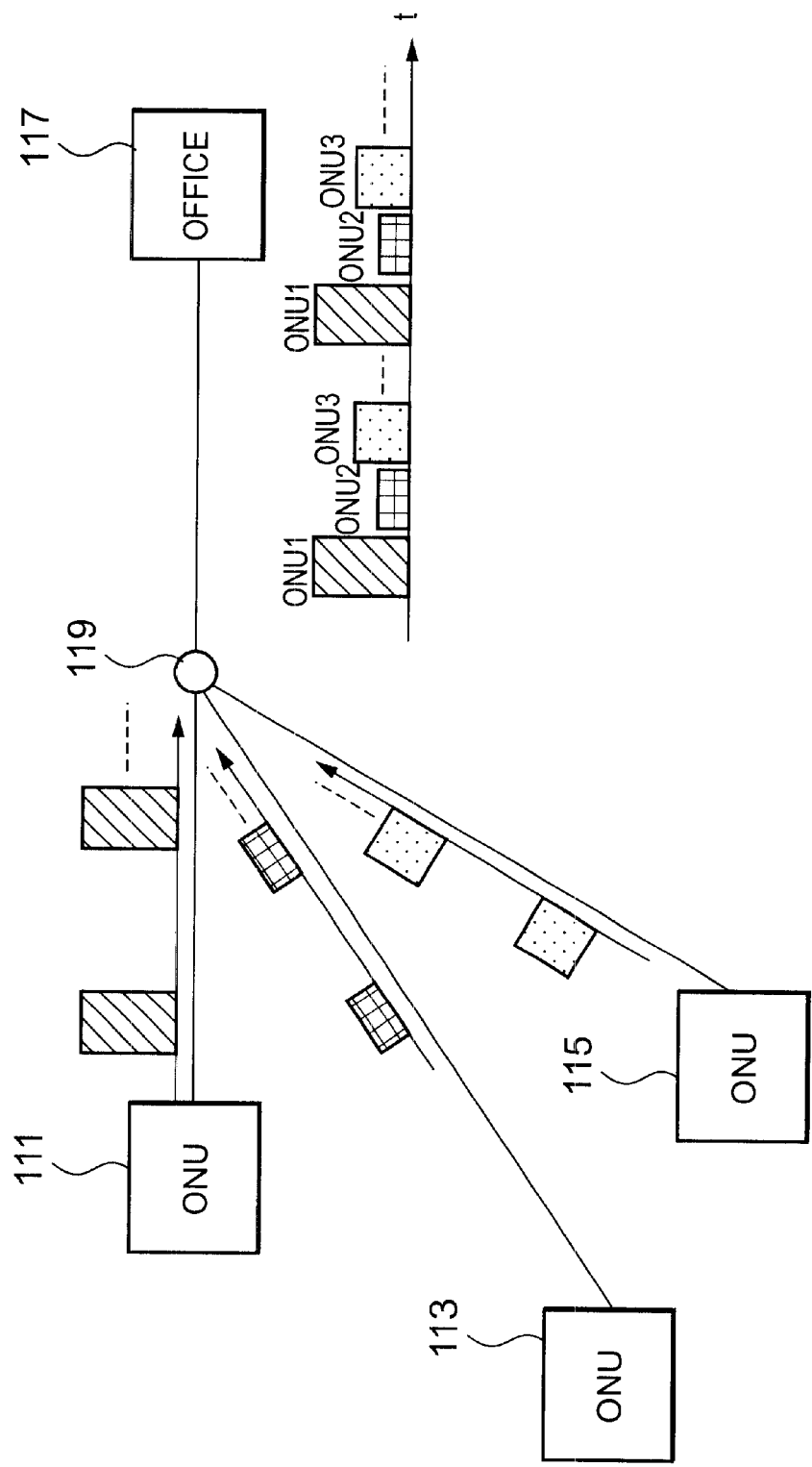
FIG. 1 is a schematic block diagram showing a specific optical transmission system to which the present invention and a conventional optical shutoff detecting circuit are applicable.
Figure 2:
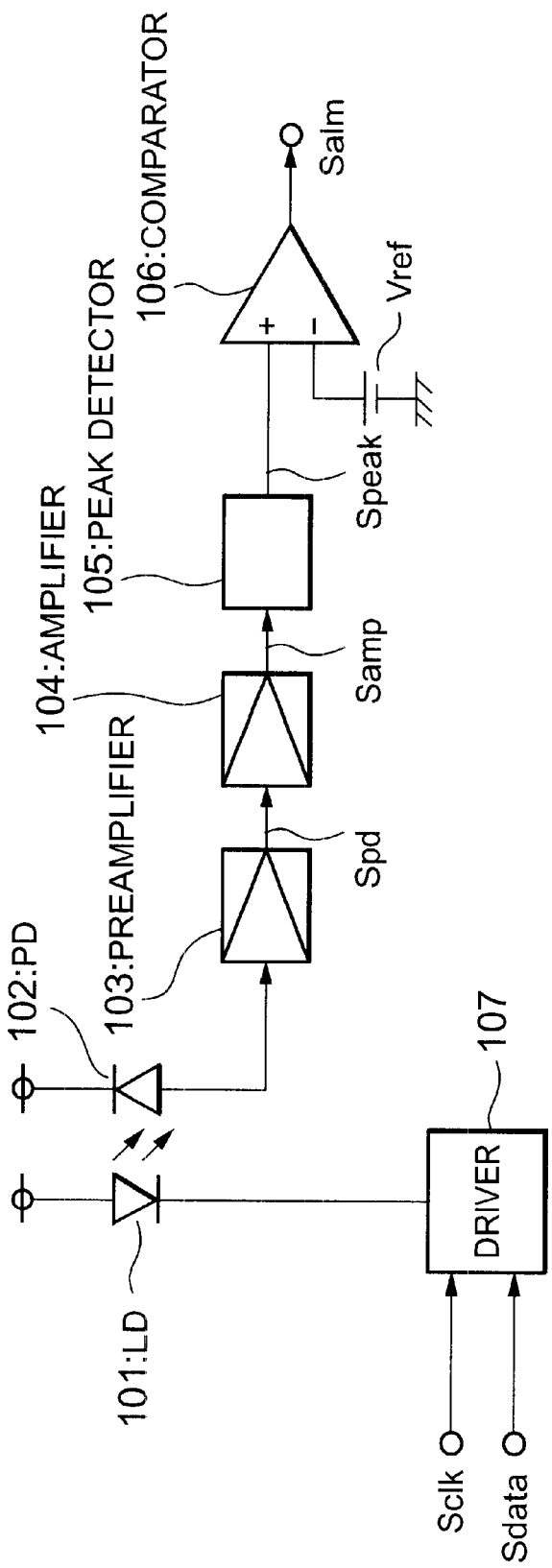
FIG. 2 is a schematic block diagram showing the conventional optical output shutoff detecting circuit.
Figure 3:
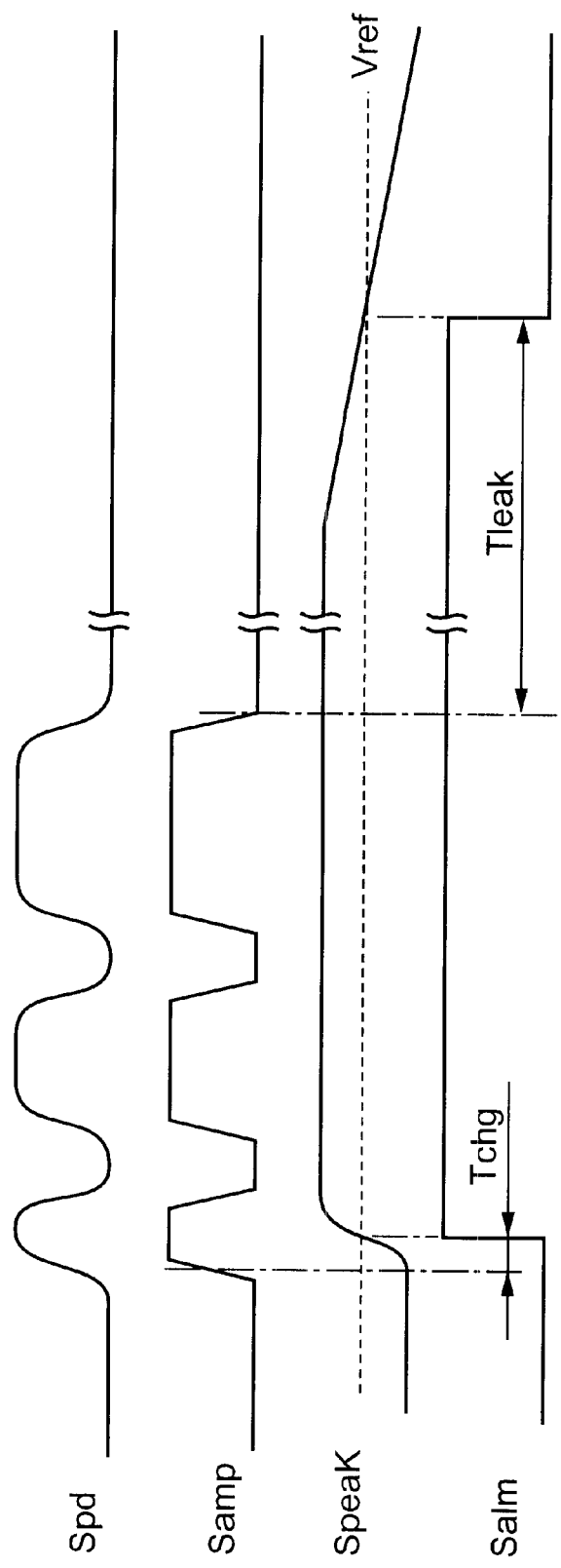
FIG. 3 is a chart showing specific waveforms of signals appearing in the conventional circuit of FIG. 2.

In the drawings, identical references denote identical structural elements.

DESCRIPTION OF THE PREFERRED EMBODIMENTS

Figure 5:
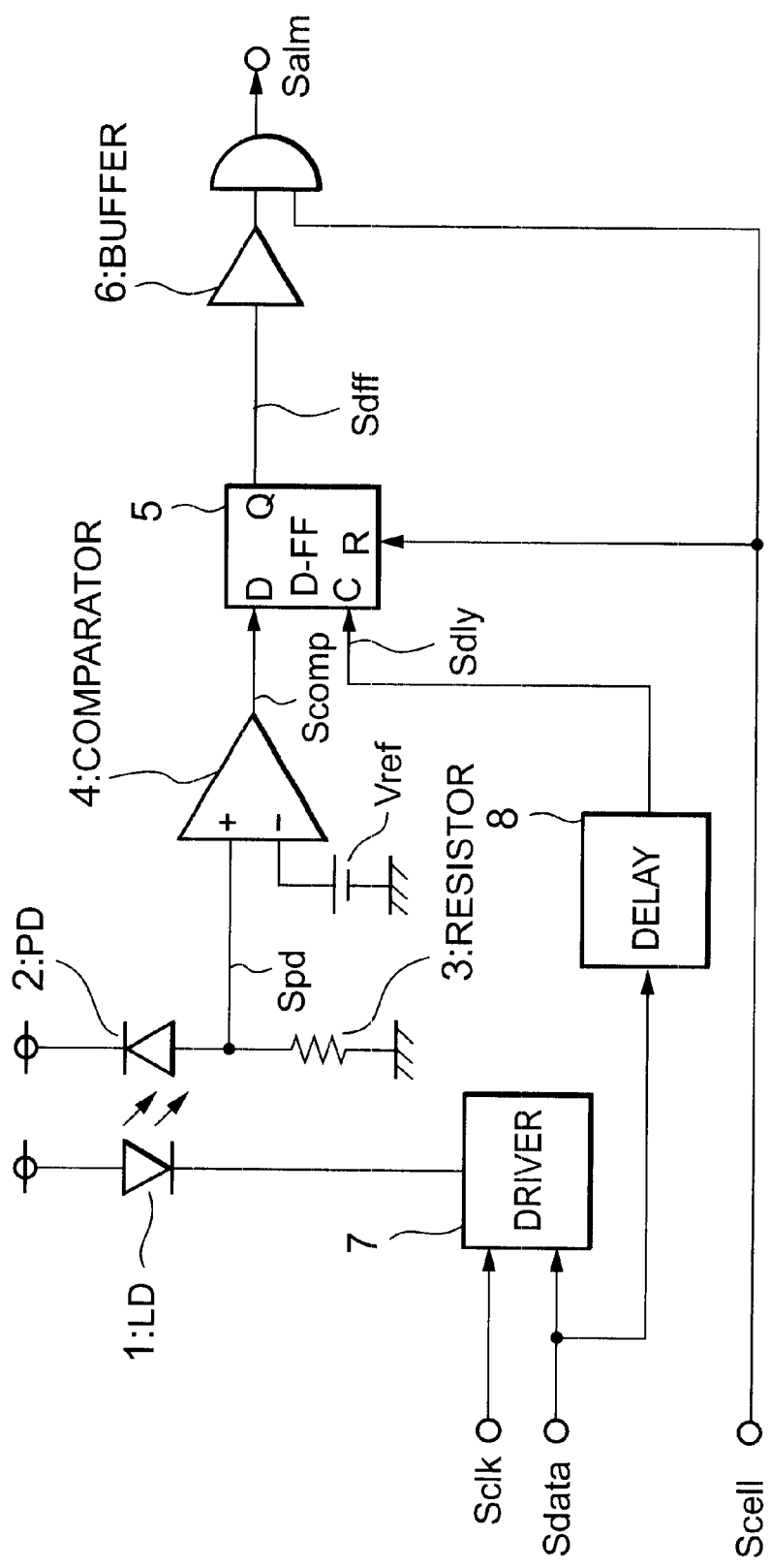
FIG. 5 is a block diagram schematically showing an optical output shutoff detecting circuit embodying the present invention.

Referring to FIG. 5, an optical output shutoff detecting circuit embodying the present invention is shown. As shown, the circuit includes a laser diode (LD) 1, a photodiode (PD) 2 for detecting the optical level of the emission from the LD 1, a resistor 3, a comparator 4, a D type flip-flop (D-FF) 5, a buffer 6, a driver 7, a delay 8, and a reference power source Vref.

The PD 2 monitors the optical output level of the LD 1 while transforming it to an electric signal Spd. The comparator 4 compares the signal Spd output from the PD2 with a reference signal Vref output from the reference power source Vref. A signal Vcomp representative of the result of comparison is fed from the comparator 4 to the D terminal of the D-FF 5. A data signal Sdata is input to the C terminal of the D-FF 5 via the delay 8.

So long as the voltage amplitude of the signal Spd is higher than the reference value Vref, the signal Scomp output from the comparator 4 remains in a high level. The D-FF 5 therefore maintains its Q terminal in a high level. When the voltage amplitude of the signal Spd momentarily drops below the reference value Fref, the signal Scomp goes low and causes the Q terminal of the D-FF 5 to go low immediately. Further, when a cell ends, a signal Scell input to the R terminal of the D-FF 5 forcibly locks the Q terminal of the D-FF 5 at a low level.

More specifically, in FIG. 5, the driver 7 digitally modulates the data signal Sdata in synchronism with a clock signal Sclk and drives the LD 1 with the resulting modulated signal. The PD 2 monitors part of a light beam issuing from the LD 1 while outputting a photocurrent corresponding to the optical output level of the LD 1. The resistor 3 is serially connected to the anode terminal of the PD 2 while a reverse bias voltage is applied to the cathode terminal of the PD 2.

The photocurrent flown to the resistor 3 turns out the voltage signal Spd and is input to the non-inverting input terminal of the comparator 4. The reference voltage Vref is input to the inverting input terminal of the comparator 4, biasing the comparator 4 to the voltage Vref. The comparator 4 outputs a high level when the signal Spd is higher than the reference voltage Vref or outputs a low level when the former is lower than the latter.

The output Scomp of the comparator 4 is input to the D terminal of the D-FF 5 while the data signal Sdata is input to the C terminal of the D-FF 5 via the delay 8, as stated earlier. The signal Scell synchronous to the period of the cells is input from the outside to the R terminal of the D-FF 5. The output Sdff of the D-FF 5 appearing on the Q terminal is fed out to the outside as an alarm signal Salm via the buffer 6.

A specific operation of the illustrative embodiment will be described with reference to FIGS. 6A and 6B. As shown in FIG. 6A, when the circuit does not detect a shutoff, i.e., when the signal Spd input to the comparator 4 is higher than the reference voltage Vref, the output Scomp of the comparator 4 remains in a high level. A signal Sdly input to the C terminal of the D-FF 5 is delayed by a preselected period of time relative to the data signal Sdata input to the driver 7. Because the signal Sdly is equivalently a clock signal input to the D-FF 5, the state of the comparator output Scomp appearing at each positive-going edge of the signal Sdly is directly fed out as the output Sdff of the D-FF 5. That is, the output Sdff of the D-FF 5 goes high or goes low at the same time as the signal Scomp goes high or goes low.

The delay 8 effects a delay selected to satisfy the setup time and hold time of the D-FF 5, taking account of the characteristic delays of the other circuit elements. For example, in a system with a transmission rate of 156 Mb/s, a delay of about 3 nanoseconds is selected. The signal Scell input to the R terminal of the D-FF 5 is indicative of the beginning and the end of a cell and remains in a high level when a cell is being input. When a cell ends and causes the signal Scell to go low, the output Sdff of the D-FF 5 is forcibly reset to a low level. The output dff of the D-FF 5 is delivered to the outside as an alarm signal Salm via the buffer 6.

As stated above, so long as the LD 1 is caused to emit by the normal signal digitally modulated in accordance with the data signal Sdata within the duration of a cell, and so long as the emission has the normal output level, the signal Salm remains in a high level representative of normal operation.

As shown in FIG. 6B, assume that the optical output level of the LD 1 drops, i.e., the shutoff of an optical output occurs in the middle of a cell. When the signal Spd drops below the reference voltage Vref, the signal Scomp goes low. In the illustrative embodiment, the reference voltage Vref is coincident with the lower limit of the range of optical output levels which the LD 1 should guarantee. The signal Sdff goes low at the same time as the signal Scomp because the signal Scomp is in a low level at the positive-going edge of the signal Sdly.

As stated above, as soon as the optical output level of the LD 1 drops below the preselected value, the signal Salm goes low and reports the abnormal condition to the outside. The illustrative embodiment can therefore detect the drop of the optical output level immediately.

Figure 7A:
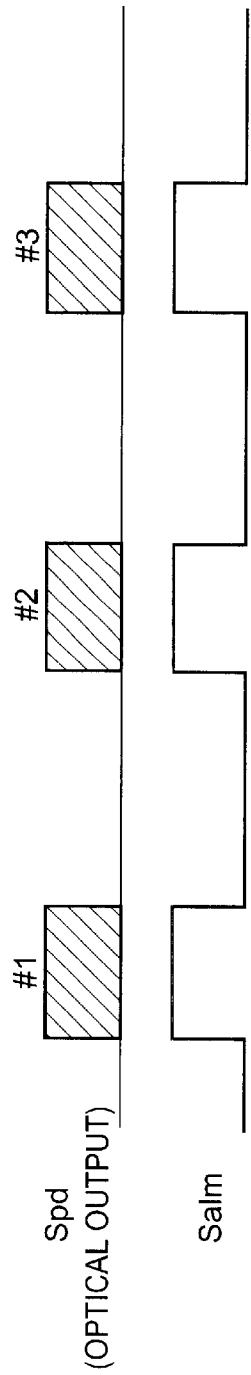
FIGS. 7A and 7B are charts each showing cells to be detected by the illustrative embodiment in a particular condition.
Figure 7B:
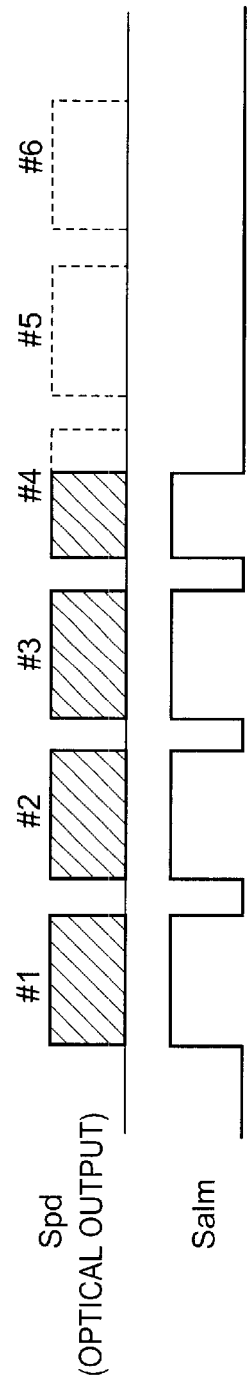

Reference will be made to FIGS. 7A and 7B for describing how the illustrative embodiment operates when cells are continuously input. FIG. 7A shows a specific condition in which cells #1, #2, #3 and so forth continuously output from a certain ONU are correctly sent at relatively long intervals. As shown in FIG. 7B, assume that the intervals between the consecutive cells is reduced, and that the optical output drops in the middle of the cell #4. Then, the resulting output signal Scomp of the comparator 4 is input to the D terminal of the D-FF 4, so that the signal Salm so changes as to generate an alarm immediately. In this manner, despite the decrease in the intervals between the cells, the illustrative embodiment can accurately detect the drop of the optical output without resorting to, e.g., the conventional capacitor discharge time.

Figure 8:
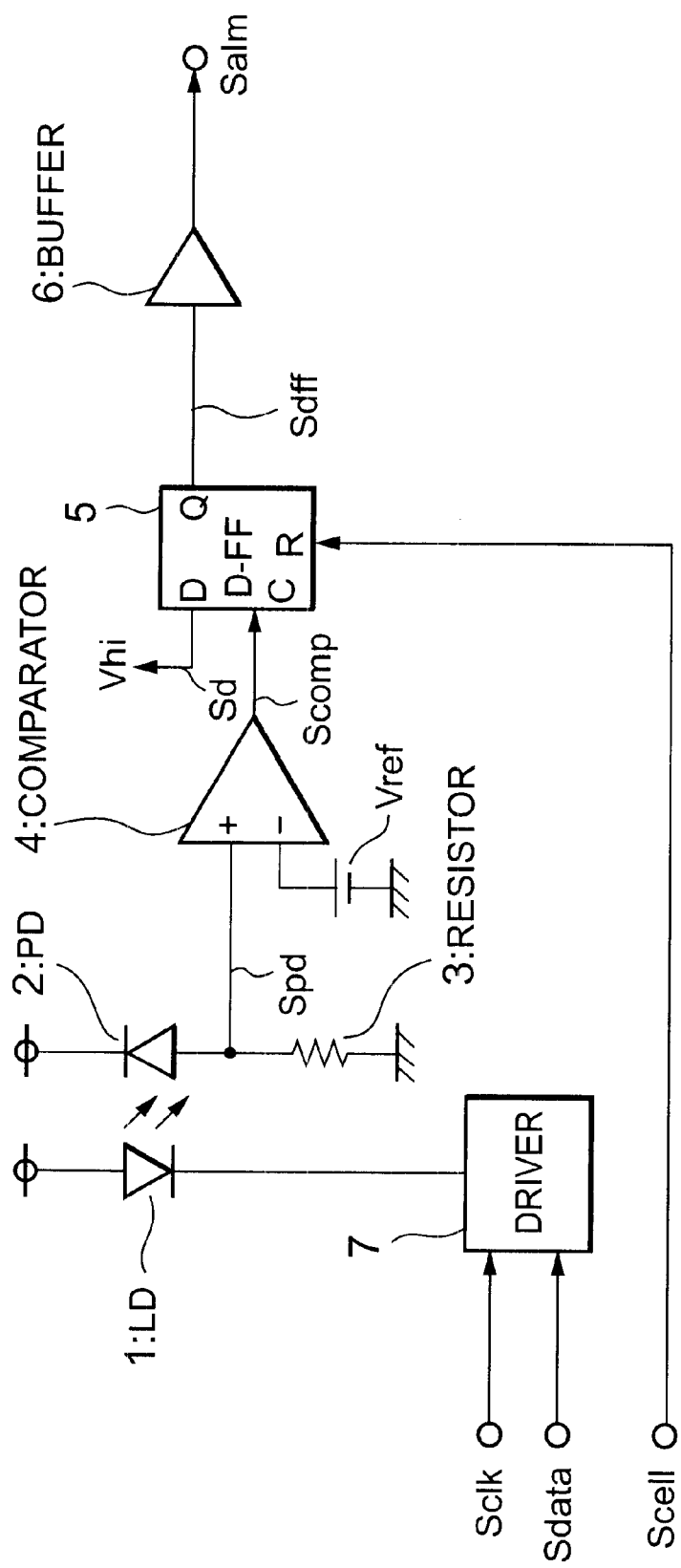
FIG. 8 is a schematic block diagram showing an alternative embodiment of the present invention.

Referring to FIG. 8, an alternative embodiment of the present invention will be described. As shown, the alternative embodiment also includes the LD 1, PD 2, resistor 3, and comparator 4. This embodiment differs from the previous embodiment in that the output Scomp of the comparator 4 is connected to the C terminal of the D-FF 5, and in that a bias voltage Vhi is connected to the D terminal of the D-FF 5 in order to constantly maintain it at a high level. Again, the signal Scell synchronous to the period of the cells is input from the outside to the R terminal of the D-FF 5. The output Sdff of the D-FF 5 is delivered to the outside via the buffer 6 as an-alarm signal Salm.

Figure 9:
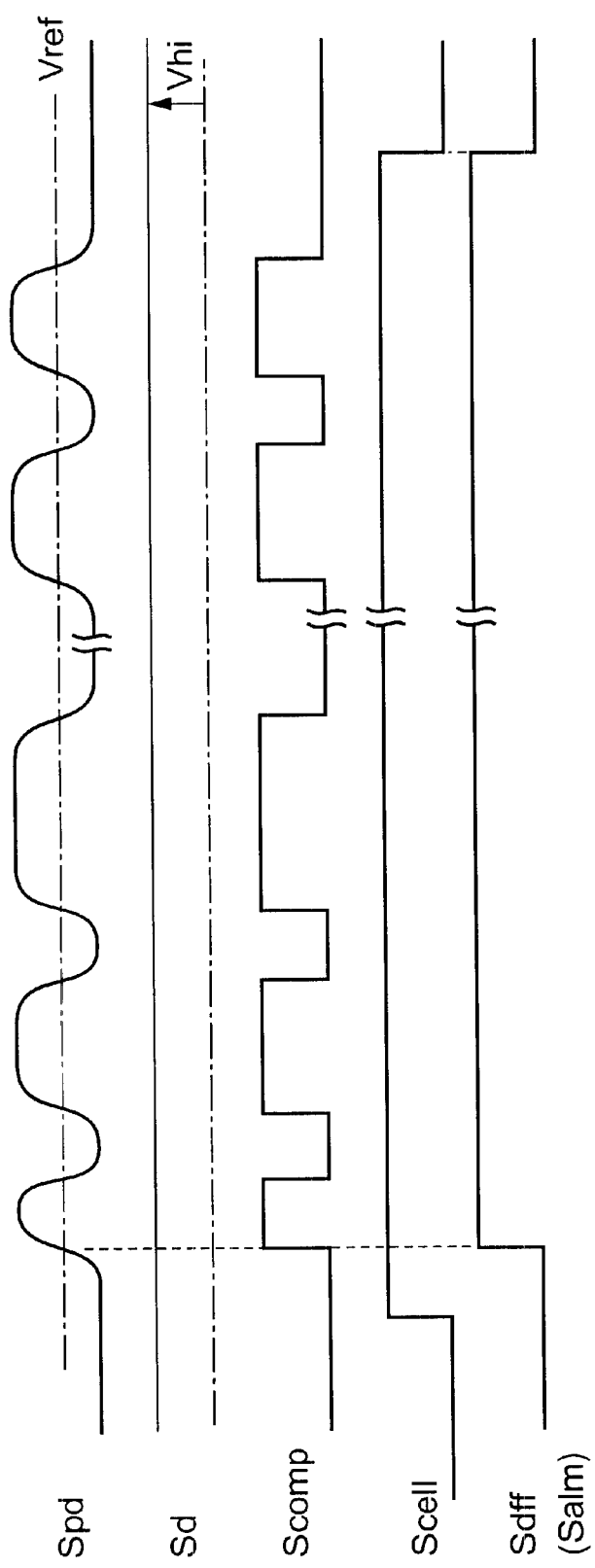
FIG. 9 is a chart showing waveforms of signals appearing in the alternative embodiment.

A specific operation of this embodiment will be described with reference to FIG. 9. As shown, the output Scomp of the comparator 4 goes high when the input signal Spd is higher than the reference voltage Vref, as in the previous embodiment. Because the D terminal of the D-FF 5 always remains in a high level, the output Sdff of the D-FF 5 goes high as soon as the signal Scomp input to the C terminal goes high. When the signal Scell goes low at the end of a cell, the signal Sdff is forcibly locked at a low level.

More specifically, at the moment when the LD 1 started emitting in response to a data signal exceeds the preselected optical output level, the signal Sdff goes high. Subsequently, the signal Sdff goes low as soon as the cell ends.

As stated above, although this embodiment cannot immediately detect the shutoff of an optical output occurred in the middle of a cell, it can detect the occurrence of a cell and does not need a delay circuit.

In summary, it will be seen that the present invention provides an optical output shutoff detecting circuit capable of generating a shutoff alarm just after the end of a cell with substantially no time lag, and thereby allowing the interval between consecutive cells to be reduced. The circuit can therefore accurately monitor an optical output while implementing a system allowing the wavelength band to be freely allotted to ONUs (occupancy ratio of the individual ONU in the up-going time domain).

Further, the circuit of the present invention can be implemented mainly by a comparator, a flip-flop and other relatively simple digital circuit elements in place of the conventional preamplifier, peak detector and other analog circuit elements. This successfully scales down the circuit.

Moreover, the flip-flop included in the circuit of the present invention determines the emission state of an LD every bit of a data signal. It follows that when the optical output level of the LD drops below a preselected value, the circuit can generate an alarm immediately.

What is claimed is:

1. An optical output shutoff detecting circuit for detecting an optical level of an optical signal, comprising a flip-flop including a D terminal to which a signal representative of a result of comparison between the output level of the optical signal and a reference voltage is input, and a C terminal to which a signal produced by delaying a data signal is input, a signal output from said flip-flop being used to detect the output level of the optical signal;

further comprising a driver for digitally modulating the data signal in synchronism with a clock signal input from an outside of said circuit to thereby output a modulated signal, and a laser diode caused to emit by said modulated signal to thereby output the optical signal based on the data signal;

further comprising a photodiode for monitoring the output level of the optical signal to thereby output a photocurrent corresponding to said output level, and a resistor serially connected to said photodiode, said photocurrent flowing to said resistor to thereby output a voltage representative of the output level of the optical signal;

further comprising a delay circuit for delaying the data signal by a delay satisfying a setup time and a hold time of said flip-flop, taking account of characteristic delays of structural elements of said circuit.

2. An optical output shutoff detecting circuit comprising:

a driver for digitally modulating a data signal in synchronism with a clock signal input from an outside of said circuit to thereby output a modulated signal;

a laser diode caused to emit light by said modulated signal;

a photodiode for monitoring emission of said laser diode while outputting a corresponding photocurrent;

a resistor connected at one end to ground and at the other end to an anode terminal of said photodiode, the photocurrent flowing through said resistor;

a comparator having a noninverting input terminal and an inverting input terminal to which a voltage appearing on the other end of said resistor and a reference voltage are respectively input, said comparator outputting a signal representative of a result of comparison between said voltage and said reference voltage;

a reference power source connected at one end to the inverting input terminal of said comparator and at the other end to ground for feeding said reference voltage;

a flip-flop including a D terminal to which the signal output from said comparator is input, a C terminal to which a signal output by delaying the data signal is input, and a Q terminal on which an output signal appears;

a delay circuit for delaying the data signal by a delay satisfying a setup time and a hold time of said flip-flop, taking account of characteristic delays of structural elements of said circuit; and a buffer for amplifying the output signal of said flip-flop and outputting a resulting signal as an alarm signal.

3. An optical output shutoff detecting circuit comprising:

a driver for digitally modulating a data signal in synchronism with a clock signal input from an outside of said circuit to thereby output a modulated signal;

a laser diode caused to emit light by said modulated signal;

a photodiode for monitoring emission of said laser diode while outputting a corresponding photocurrent;

a resistor connected at one end to ground and at the other end to an anode terminal of said photodiode, the photocurrent flowing through said resistor;

a comparator having a noninverting input terminal and an inverting input terminal to which a voltage appearing on the other end of said resistor and a reference voltage are respectively input, said comparator outputting a signal representative of a result of comparison between said voltage and said reference voltage;

a reference power source connected at one end to the inverting input terminal of said comparator and at the other end to ground for feeding said reference voltage;

a flip-flop having a C terminal to which the signal output from said comparator is input, a D terminal to which a bias voltage constantly remaining in a high level is input, and a Q terminal on which an output signal appears; and a buffer for amplifying the output signal of said flip-flop and outputting a resulting signal as an alarm signal.

* * * * *